March 4, 1930.  S. R. BROWN  1,749,063
SAFETY DEVICE
Filed Nov. 26, 1927
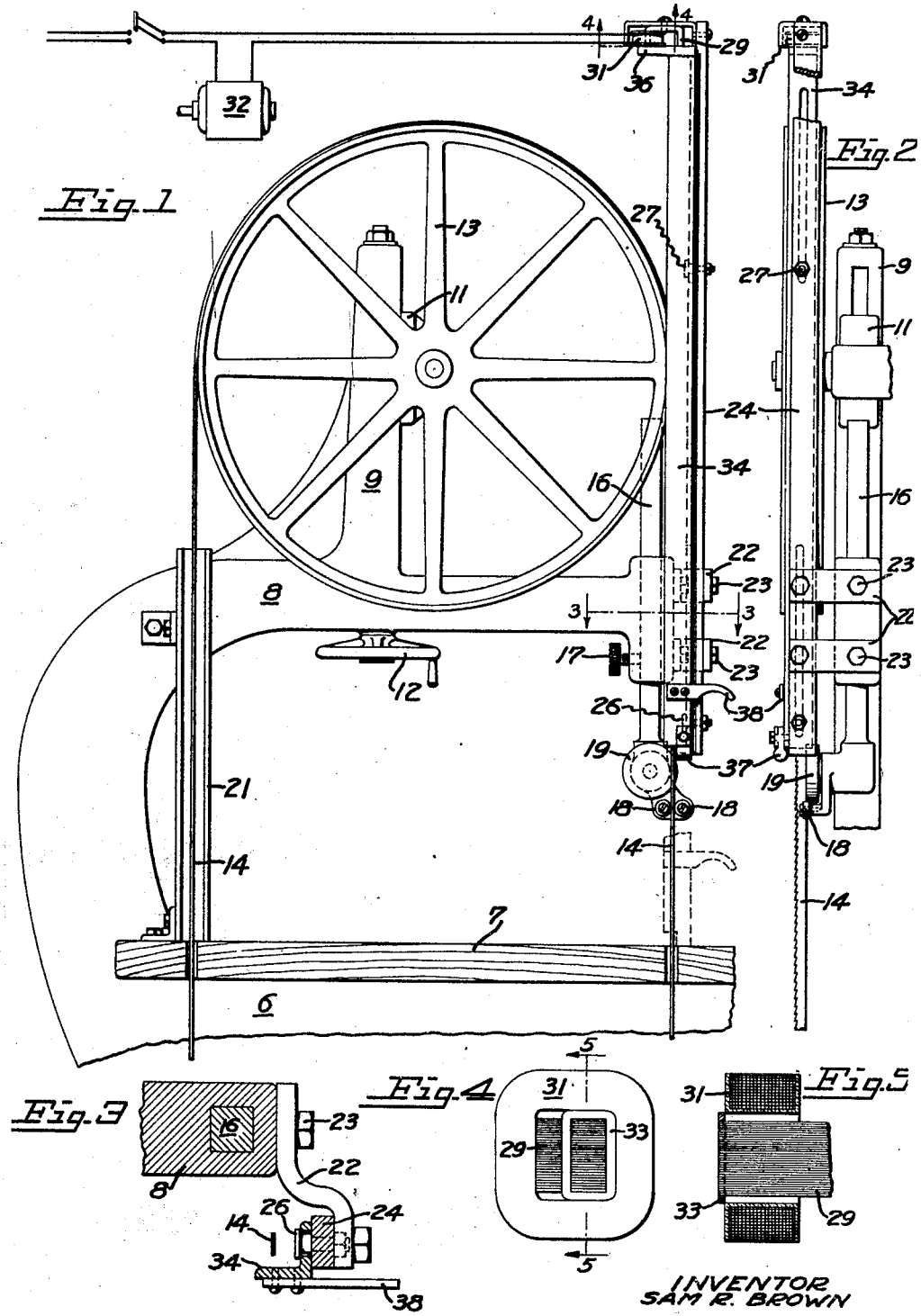
INVENTOR
SAM R. BROWN
BY Charles S. Evans
HIS ATTORNEY.

Patented Mar. 4, 1930

1,749,063

UNITED STATES PATENT OFFICE

SAM R. BROWN, OF BURLINGAME, CALIFORNIA, ASSIGNOR OF ONE-HALF TO JOSEPH A. BROWN, OF SAN FRANCISCO, CALIFORNIA

SAFETY DEVICE

Application filed November 26, 1927. Serial No. 235,825.

My invention relates to guards for machines having working parts liable to cause injury and particularly to guards for band saws.

It is an object of my invention to provide a guard which will automatically become operative when the machine to which it is attached has been disconnected from its power supply and is "coasting", and the operator therefor has unconsciously relaxed his vigilance.

Another object of my invention is to provide a guard which is operative until deliberately made inactive by the operator of the machine.

Still another object is to provide a guard which may readily be applied to machines of various makes, and which may be installed on a machine after it is in service.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Fig. 1 is a front elevation of a band sawing machine having the guard of my invention installed thereon. The figure shows schematically the power circuit of the machine, and the dotted lines show the active position of the guard.

Fig. 2 is a side elevation of the machine shown in Fig. 1. Parts of the machine are cut away in both figures to conserve space.

Fig. 3 is a detail sectional view on an enlarged scale, the plane of section being on the line 3—3 of Fig. 1.

Figs. 4 and 5 are detail views, also on an enlarged scale, showing the pole construction of the magnetic clutch; the plane of the view of Fig. 4 being on the line 4—4 of Fig. 1, and of Fig. 5 being a section on the line 5—5 of Fig. 4.

There are many machines which employ working parts capable of inflicting serious injuries to one coming into accidental contact with them. This is especially true of woodworking machinery as a class. The cutters work at high speed, the moving parts are heavy, and the friction is low. Such machines are dangerous at all times, but experience shows that a large proportion of the injuries resulting from their use occur after the power supply is turned off, and while the machine is running under its momentum, or "coasting".

There are two causes for this state of affairs. The first is that when the machine is running at full speed it makes a sound which serves as an audible warning signal, and attracts attention to the fact that it is running. As the machine slows down this sound drops in both volume and pitch, and becomes inaudible when the machine still has momentum enough to inflict serious harm. The second cause is an unconscious let down of vigilance on the part of the operator after he has shut off the power. Subconsciously he regards the danger as past, because he has taken the necessary steps to remove it, and in the few seconds or minutes before it actually disappears the accident occurs.

Where a guard can be applied which prevents contact with the dangerous parts at all times such a guard should be used, but there is a class of machines such as band-saws where a guard of this character would prevent the satisfactory operation of the machine, and it is to meet this situation that my invention finds its application.

In terms of broad inclusion, my invention comprises a guard which normally assumes its operative position, either thru the action of gravity, a spring, or other means. The guard may be moved from this position by the operator, and a clutch holds the guard in the inoperative position as long as power is being applied to the machine. Interrupting the power supply releases the clutch, and the guard then immediately returns to its operative or effective position, remaining in this position until the power supply is re-established and the guard is again moved by the operator.

Describing a preferred form of my invention in more detailed terms, the figures show a standard type of band sawing machine having a frame 6 and a table 7. The frame carries an arm 8 extending over the table. A vertical guideway 9 rising from the arm has a sliding block 11 mounted thereon, adjustable by the hand-wheel 12. On the block is journaled the pulley 13 over which runs the saw 14.

The arm 8 extends past the guideway and in its ends is a square vertical hole thru which slides the saw guide 16 which may be locked in position by the knuckled screw 17. At the lower end of the saw guide is formed a foot on which are mounted a pair of rollers 18 between which the saw runs, and a rotatable disk 19 against which the back edge of the saw abuts. A trough shaped guard 21 prevents accidental contact with the back reach of the saw.

To this machine my guard is applied. A pair of horizontal brackets 22 are fastened to the end of the arm 8 by the cap-screws 23. These brackets carry an upright rectangular bar 24.

The lower end of the bar 24 extends a few inches below the arm 8, dropping as low as possible without interfering with the foot of the guide 16. The upper end of the bar extends above the highest position of the axis of the pulley 13 about as far as the lower end is above the table. These distances are approximate only, as the exact dimensions are not important.

Near its lower end the bar carries a bolt 26. The bolt has a T or mushroom head, and a shoulder which rests against the bar. Together, with a similar bolt 27 carried by the upper portion of the bar it serves as a support and guide on which the guard slides.

At the top of the bar is mounted an electromagnet. The magnet is preferably protected by a cup shaped metal housing, riveted to the top of the bar. The magnet itself may be of the familiar horse-shoe form, secured within the housing with its poles pointing down. The construction of the magnet will vary with the type of motor and current supply available for driving the saw. Where the supply is direct current the core 29 carries a coil 31 consisting of a few turns of wire, and is connected in series with the motor 32 as shown schematically in Fig. 1. If the current supply is alternating the preferred connection is in shunt with the motor. In this case a large number of turns is used for the coil, and a shading coil 33 may be used in the well known manner, surrounding a portion of the pole faces in order to obtain a continuous traction from the magnet in spite of the discontinuous nature of the current. I prefer to use a laminated core whatever the character of the supply current.

For the guard itself I prefer to use a metal angle 34. One web of the angle is slotted at its upper and lower ends. The bolts 26 and 27 pass thru these slots and the guard slides on them, the proportions being such that in its raised position the bottom of the guard is level with the bottom of the bar, while in its lower position the guard rests on the table 7.

At its upper end the guard carries a horizontally extending armature 36 which engages with the magnet poles when the guard is raised. A rubber bumper 37 is preferably fixed at the bottom of the guard to absorb the shock when it is dropped, a handle 38 near the bottom of the guard facilitates raising it.

The mode of operation of the device is evident. When the motor is started the magnet is excited. If the guard is then raised until the armature 36 engages with the magnet it will be held there, allowing the saw to be used in the usual manner, without interference from the guard. Turning off the motor de-energizes the magnet, and the guard at once drops, giving full protection while the saw is coasting.

Altho the electro-magnetic control described offers perhaps the readiest means of operation, it is possible to obtain the same protection by mechanical means, a catch interlocking with a belt shifting device for example. The same principles may also be applied to guards for planers, stickers, or any machines where the same hazards exist.

I claim:

1. In combination with a machine having working parts liable to cause injury, means for driving said parts, a movable guard for said working parts, and means controlled by said driving means for retaining said guard in inoperative position.

2. In combination with a machine having working parts liable to cause injury, means for driving said parts, a movable guard for said working parts, and means controlled by said driving means for retaining said guard in inoperative position and releasing said guard when the driving means is inoperative.

3. In combination with a machine having working parts liable to cause injury, means for driving said parts, a guard manually movable to an inoperative position, and means controlled by said driving means for retaining said guard in said position during operation of said driving means.

4. In combination with a machine having working parts liable to cause injury, an electric driving motor, a supply circuit for said motor, a movable guard for said working parts, and an electro-magnetic clutch actuated from said supply circuit for retaining said guard in inoperative position when said supply circuit is energized.

5. In combination with a machine having working parts liable to cause injury, an electric driving motor, a supply circuit for said motor, a movable guard for said working parts, an electro-magnet on said machine actuated from said supply circuit and an armature on said guard cooperating with said magnet to hold the guard in inoperative position when the magnet is energized.

6. In combination with a band saw, a frame for said saw, an electric motor for driving said saw, a supply circuit for said motor, a guard for said saw movable on said frame and electro-magnetic means actuated from said supply circuit for retaining said guard in inoperative position when said circuit is energized.

7. In combination with a band saw, a frame for said saw, an electric motor for driving said saw, a supply circuit for said motor, a guard for said saw vertically slidable on said frame, and electro-magnet means actuated from said supply circuit for retaining said guard in its upper position.

In testimony whereof, I have hereunto set my hand.

SAM R. BROWN.